US006443267B1

(12) United States Patent
Burbank et al.

(10) Patent No.: US 6,443,267 B1
(45) Date of Patent: Sep. 3, 2002

(54) WHEELBARROW DISK BRAKE ASSEMBLY (75) Inventors: Daniel P. Burbank, P.O. Box 227 Ben Berry Rd., Moultonborough, NH (US) 03254; Randy Oliver, Limerick, ME (US)

(73) Assignee: Daniel P. Burbank, Port Chester, NY (US)

( * ) Notice: Subject to any disclaimer, the term of this patent is extended or adjusted under 35 U.S.C. 154(b) by 0 days.

(21) Appl. No.: 09/628,406

(22) Filed: Aug. 1, 2000

(51) Int. Cl.[7] .................................................. B60T 1/00
(52) U.S. Cl. ............................. 188/2 R; 188/17; 188/19
(58) Field of Search .............................. 188/2 D, 2 R, 188/26, 17, 18 A, 71.1, 73.46

(56) References Cited

U.S. PATENT DOCUMENTS

| 2,716,031 | A |   | 8/1955  | Roessler ............... 280/47.31 |
| 3,096,853 | A |   | 7/1963  | Farrand ..................... 188/18 |
| 3,950,005 | A |   | 4/1976  | Patterson .............. 280/47.31 |
| 3,968,974 | A | * | 7/1976  | Wetzel ................... 280/47.31 |
| 3,994,370 | A |   | 11/1976 | Gebhardt et al. ...... 188/218 XL |
| 4,252,334 | A |   | 2/1981  | Filkins ................... 280/47.26 |
| 4,479,658 | A |   | 10/1984 | Michaux ............... 280/47.31 |
| 4,589,508 | A |   | 5/1986  | Hoover et al. ............ 180/19.1 |
| 4,609,078 | A | * | 9/1986  | Bach et al. ............. 188/73.43 |
| 4,618,159 | A | * | 10/1986 | Kozyra et al. ............... 180/93 |
| 4,640,520 | A |   | 2/1987  | Wing et al. ............ 280/47.31 |
| 4,767,128 | A |   | 8/1988  | Terhune ................... 280/47.2 |
| 4,962,833 | A |   | 10/1990 | McCurdy .................... 188/2 R |
| 4,967,893 | A |   | 11/1990 | Vogele ................... 192/107 R |
| 5,393,081 | A |   | 2/1995  | Mortenson ............... 280/47.27 |
| 5,398,999 | A | * | 3/1995  | Last ........................... 301/6.1 |
| D357,099   | S |   | 4/1995  | Sammons, Jr. .............. D34/27 |
| 5,411,120 | A | * | 5/1995  | Null ....................... 188/112 R |
| 5,520,269 | A |   | 5/1996  | Yamamoto et al. ... 188/218 XL |
| 5,673,773 | A | * | 10/1997 | Lai ......................... 188/24.17 |
| 5,690,191 | A |   | 11/1997 | Burbank ..................... 188/2 D |
| 5,794,307 | A |   | 8/1998  | Overcash et al. ......... 16/114 R |
| 5,799,960 | A |   | 9/1998  | Davis, Sr. ................ 280/47.41 |
| 5,810,375 | A |   | 9/1998  | Hoffarth et al. ......... 280/47.31 |
| 5,865,275 | A | * | 2/1999  | Anger et al. .............. 188/18 A |
| 5,878,827 | A |   | 3/1999  | Fox ............................ 180/19.1 |
| 6,152,267 | A | * | 11/2000 | Iwai et al. .................... 188/26 |

FOREIGN PATENT DOCUMENTS

EP  0014101 A1 * 8/1980

* cited by examiner

Primary Examiner—Jack Lavinder
Assistant Examiner—Melody M. Burch
(74) Attorney, Agent, or Firm—St. Onge Steward Johnston & Reens, LLC (57) ABSTRACT A disk brake system for original equipment or retrofit installation in a wheelbarrow or hand truck uses a disk rotor and a caliper bracket both mounted to the wheel or axle, so as to provide the disk brake pads of the caliper with a fixed position relative to the disk rotor. The caliper bracket is stabilized by a separate U-shaped mounting bracket, or by one or more mounting arms affixed to the caliper bracket, which are secured to one handle.

29 Claims, 6 Drawing Sheets

WHEELBARROW DISK BRAKE ASSEMBLY

FIELD OF THE INVENTION

The present invention relates to wheelbarrow devices and more particularly pertains to a wheelbarrow disk brake assembly suitable for single and double wheel wheelbarrows which is uniquely adapted for use quick mounting with a minimum of sizing adjustments in a retrofit or original equipment context.

BACKGROUND OF THE INVENTION

Wheelbarrows are familiar load carrying products that typically are constructed from two long handles connected together at their front ends and being separated at their rear ends sufficiently so that the user can grasp the handles and lift them. A cargo carrying bin is mounted on top of the handles. A wheel assembly is mounted on the underside of the handles near their front ends to allow movement of the wheelbarrow, and a pair of legs are located rearwardly of the wheel assembly to allow the wheelbarrow to stand on the two legs and the wheel. Known prior art wheelbarrow devices include U.S. Pat. Nos. 4,962,833; 4,640,520; 4,479,658; 5,433,464; U.S. Design Pat. No. 303,512 and U.S. Pat. No. 5,390,943. The traditional single wheel wheelbarrow is far and away the most commonly used type of wheelbarrow because of its flexibility. Double wheel wheelbarrows provide greater stability, and greater ease in rolling, but are generally not liked by workmen because once pointed in a direction, they are difficult to turn.

One of the inventors herein, Daniel Burbank, has developed a disk brake system for a wheelbarrow as disclosed in U.S. Pat. No. 5,690,191, the disclosure of which is incorporated by reference. The patented disk brake system discloses a disk brake rotor mounted to the wheel of the wheelbarrow by a plurality of bolts, and a disk brake caliper that is mounted to one of the wheelbarrow handles. A hand operated lever is mounted on the handles of the wheelbarrow and is mechanically connected to the disk brake caliper by a brake cable. The disk brake system of the prior Burbank patent provides an apparatus useful for controlling the downward speed of a wheelbarrow that can develop when transporting a full load downhill; and allows comfortable holding of a wheelbarrow in a stationary position, even on a hill; and helps in the dumping of the wheelbarrow load by fixing the wheel in position so that lifting energy used to dump the wheelbarrow contents is not diverted by undesired rolling of the wheelbarrow when the lifting is occurring. However, installation of this system requires disassembly of the wheelbarrow and various drilling operations to mount the disk brake system to the wheelbarrow.

SUMMARY OF THE INVENTION

It is an object of the present invention to provide a new wheelbarrow braking system which may be easily and efficiently mounted onto existing wheelbarrows without requiring drilling or other modification of the existing wheelbarrow.

It is a further object of the present invention to provide a new wheelbarrow braking system which may be easily and efficiently mounted onto new wheelbarrows without requiring special operations or tooling.

It is a further object of the present invention to provide a new wheelbarrow braking system which may be easily and efficiently mounted onto both single wheel wheelbarrows and double wheel wheelbarrows.

It is another object of the present invention to provide a new wheelbarrow braking system that is effective to facilitating braking of a conventional wheelbarrow while transporting heavy loads on hills and uneven surfaces.

A typical wheelbarrow to which the invention applies has two handles and a wheel assembly near a forward end of the two handles. The wheel assembly includes an axle, and at least one wheel mounted on the axle, and axle mounting brackets mounted to the handles and holding the axle. The wheelbarrow disk brake assembly has a mounting bracket having two spaced apart arms mounted to one wheelbarrow handle; and a caliper bracket having an axle hole for receiving the axle and thereby mounting the caliper bracket to the axle. The caliper bracket has one or more support arms extending away from the axle. In one embodiment, the mounting bracket and the caliper bracket are separate parts, and the caliper bracket is received between the spaced apart arms of the mounting bracket and held in a desired orientation, preferably with the support arms extending upwardly. In another embodiment the caliper bracket and the mounting bracket are combined in a single integral part, with the mounting bracket arms extending laterally from the caliper bracket.

A brake caliper assembly is mounted to the caliper bracket at a selected distance from the axle hole of the caliper bracket. The brake caliper assembly includes a housing containing an actuator and opposing brake pads. A disk rotor is mounted to the axle or wheel cylindrical portion of the wheelbarrow by a mounting collar or direct welding. The disk rotor has a central opening and a diameter selected such that a peripheral area of the disk rotor is positioned within the brake caliper assembly between the opposing brake pads. The caliper assembly is operable by actuation of a brake handle connected to the caliper by a brake cable.

Other objects, aspects and features of the present invention in addition to those mentioned above will be pointed out in or will be understood from the following detailed description provided in conjunction with the accompanying drawings.

DETAILED DESCRIPTION OF THE DRAWINGS

Figure 1:
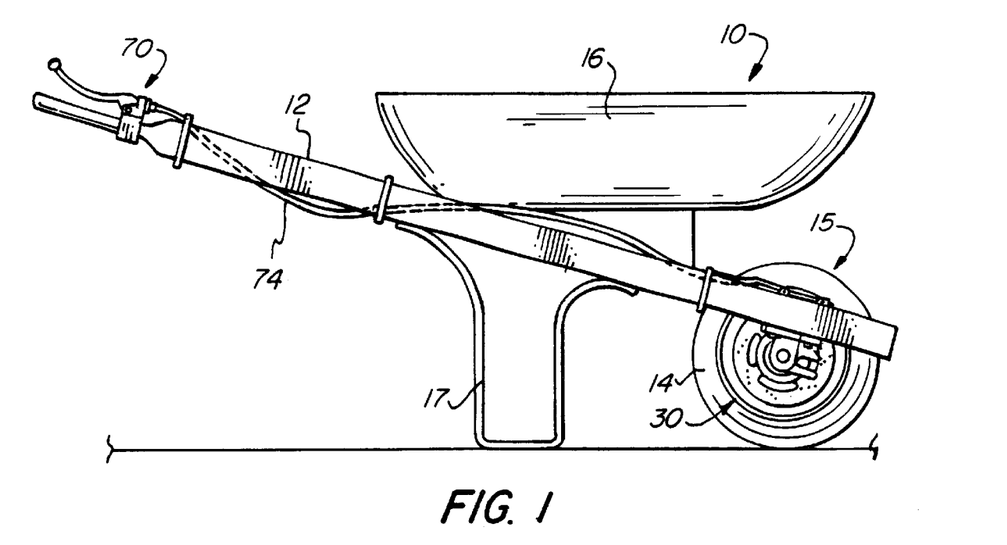
FIG. 1 is a side elevation view of a wheelbarrow with an wheelbarrow disk brake assembly in accordance with one embodiment of the invention.

Referring now to FIG. 1 a wheelbarrow 10 is shown. Wheelbarrow 10 has two handles 12 and a wheel assembly 14 near a forward end 15 of the two handles 12. A wheelbarrow bin 16 is mounted to the upper side of handles 12, and wheelbarrow legs 17 are mounted to the underside of handles 12, rearwardly of the wheel assembly 14 and the bin 16.

In the following description and in the Figures, like elements are identified by the same element number. Referring to FIGS. 3–6, the wheel assembly 14 includes an axle 20, and at least one wheel 21 mounted on the axle 20 and axle mounting brackets 24 mounted to the handles 12 and holding the axle 20. Wheel 21 is constructed from a hub 22 including cylindrical hub portions 23 and a tire 25.

Wheelbarrow disk brake assembly 30 includes a caliper bracket 32 having an axle hole 34 for receiving the axle 20 and thereby mounting the caliper bracket 32 to the axle 20. The caliper bracket 32 has one or more support arms 36 extending away from the axle 20. Preferably, the caliper bracket 32 extends generally upwardly from axle 20.

A brake caliper assembly 40 is mounted to one or more support arms 36 of the caliper bracket 32 by threaded machine screws or welding at a selected distance from the axle hole 34 of the caliper bracket 32. The brake caliper assembly 40 includes a housing 42 containing an actuator 44 and opposing brake pads 46.

A disk rotor 50 is mounted to the axle 20 or cylindrical hub portion 23 of the wheel 21 by a mounting collar 60 or by welding or staking. Essentially, the disk rotor 50 can be mounted to, axle 20 if the wheel 21 is also non-rotatably affixed to axle 20 (e.g. the axle turns in axle mounting brackets 24). However, if wheel 21 is provided with bearings and allowed to rotate on axle 20, then axle 20 will be nonrotatably mounted to the axle mounting brackets 24; in such case, the disk rotor 50 must be mounted in some way to the rotatable wheel 21.

The disk rotor 50 may be solid, or may be perforated to reduce weight. Disk rotor 50 has a central axial opening 52. Disk rotor 50 and caliper bracket 32 are sized to be complementary so that a peripheral area 54 of the disk rotor 50 is positioned within the brake caliper assembly 40 between the opposing brake pads 46. Specifically, the diameter of disk rotor 50 and the length of caliper bracket 32 are sized such that the peripheral area 54 of the disk rotor 50 is positioned within the brake caliper assembly 40 between the opposing brake pads 46.

Figure 3:
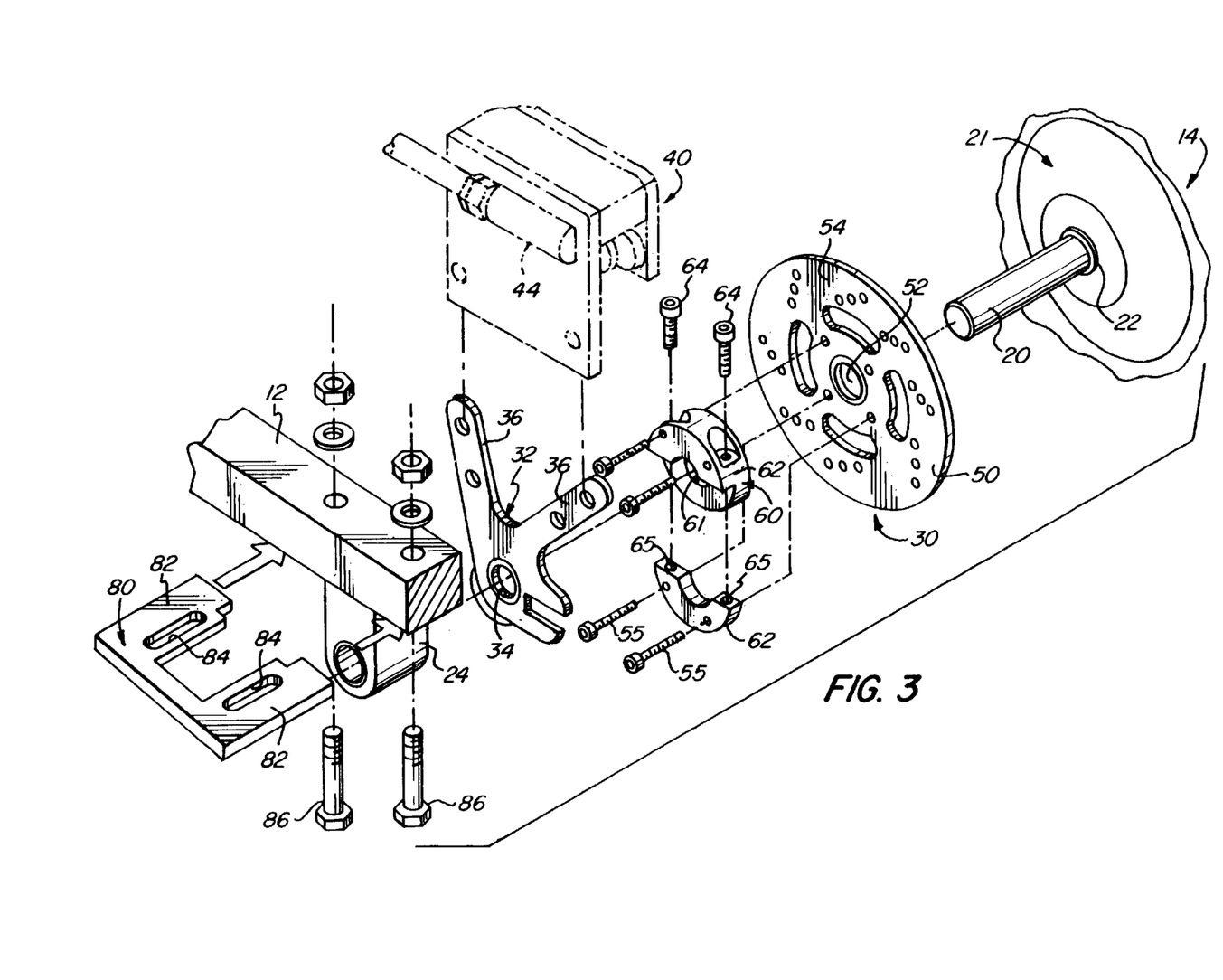
FIG. 3 is an exploded perspective view of a wheelbarrow disk brake assembly in accordance with one embodiment of the invention.
Figure 4:
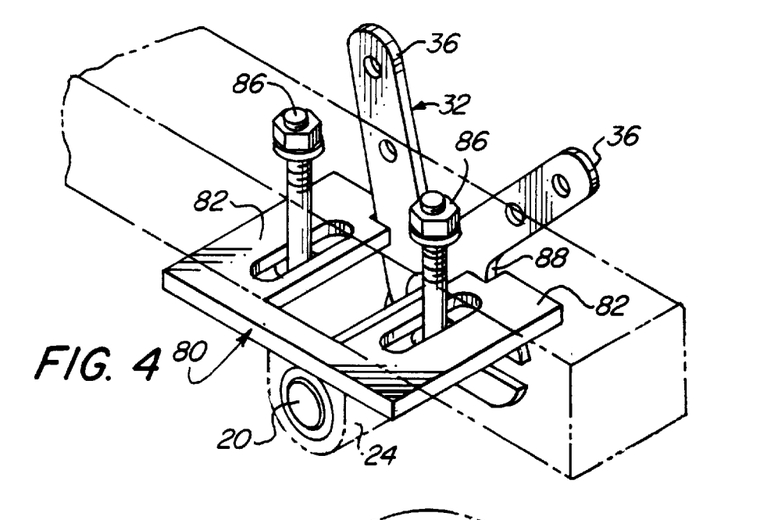
FIG. 4 is a perspective view with wheelbarrow handles in phantom outline showing the caliper and mounting brackets of the wheelbarrow disk brake assembly of FIG. 3.

Disk rotor 50 is preferably mounted to the cylindrical hub portion 23 by a mounting collar 60. Mounting collar 60 has an axial opening 61 which is aligned with the central axial opening 52 of disk rotor 50. Disk rotor 50 may be welded, riveted, or bolted to mounting collar 60. As shown in FIG. 3, in one embodiment, disk rotor 50 is attached to mounting collar 60 by bolts or threaded screw fasteners 55 that fit into tapped holes in the disk rotor 50. Mounting collar 60 is mounted to the axle 20 or cylindrical hub portion 23 by any appropriate method, including welding, staking, fixing in place with a set screw, or clamping of the collar onto the axle 20 or hub portion 23.

Figure 5:
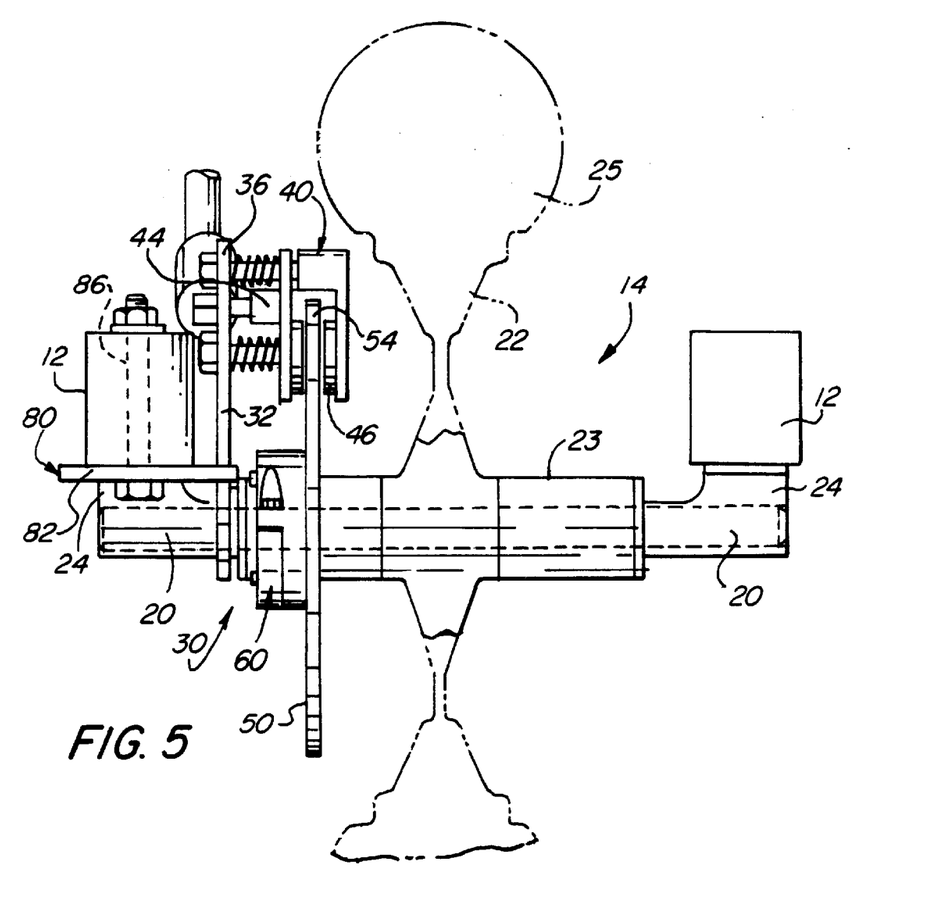
FIG. 5 is a front elevation view with the wheelbarrow wheel in phantom outline showing the wheelbarrow disk brake assembly of FIG. 3.
Figure 6:
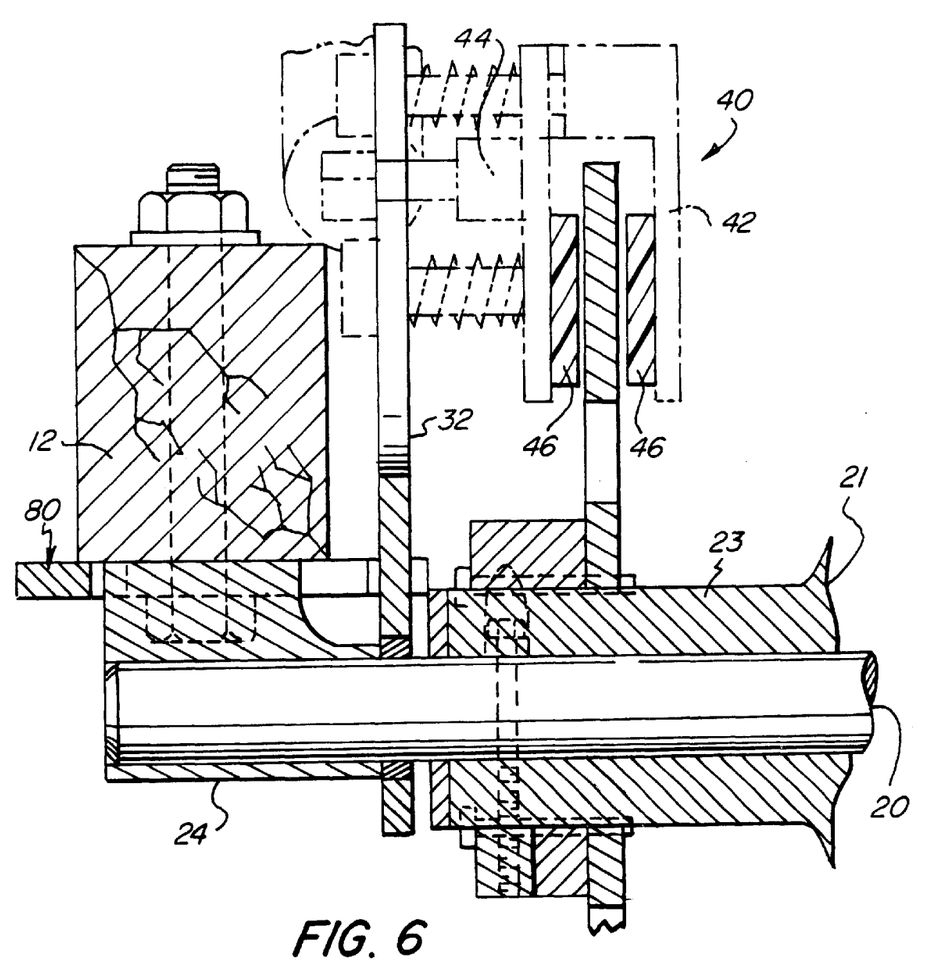
FIG. 6 is a front elevation view with cutaway views showing the wheelbarrow disk brake assembly of FIG. 3.

As shown in FIGS. 3, 5, and 6, one convenient method for retrofit mounting of the disk rotor 50 to a wheelbarrow is the use of a clamping mounting collar 60. In such case, mounting collar 60 is a collar which has opposing portions 62 that clamp the wheelbarrow axle 20 or wheel cylindrical portion 23 between the opposing portions. The opposing portions 62 are tightened together to clamp down on the axle 20 or cylindrical hub portion 23 by one or more bolts or screw threaded fasteners 64 that fit into tapped holes 65 in the mounting collar 60. The opposing portions may be separate portions, or the mounting collar may be a single C-shaped element in which the opposing portions are opposite ends of the mounting collar.

Figure 8:
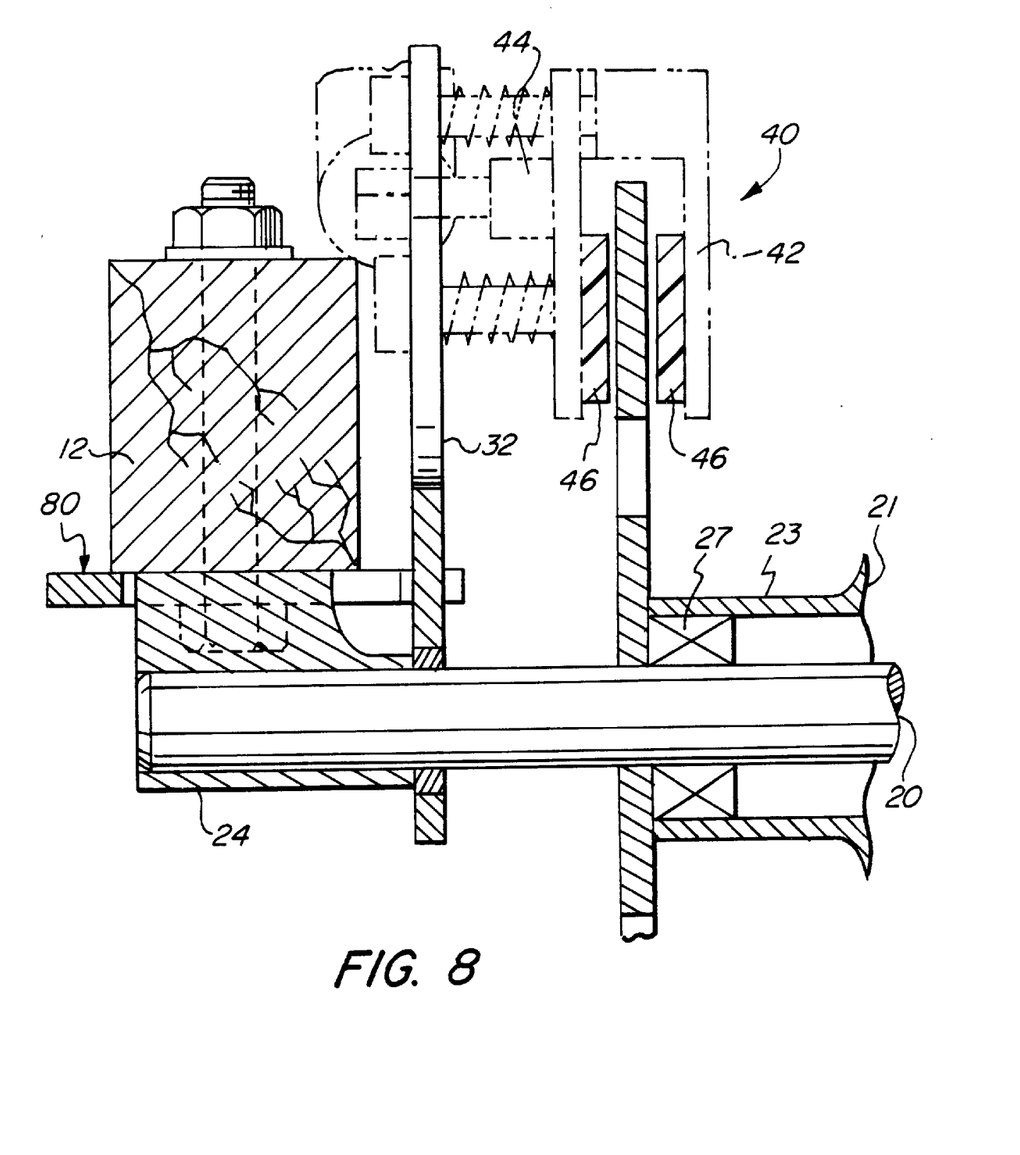
FIG. 8 is a cross-sectional view showing an alternative embodiment for mounting the disk rotor of the wheelbarrow disk brake assembly.

In another embodiment, shown in FIG. 8, more suitable for original equipment manufacture, the disk rotor 50 is affixed, by welding, riveting, staking, bolting, or screwing to the hub bushing 27 that is typically located within the hub portion 23 surrounding the axle 20; or disk rotor 50 can be welded directly to the hub portion 23.

Figure 2:
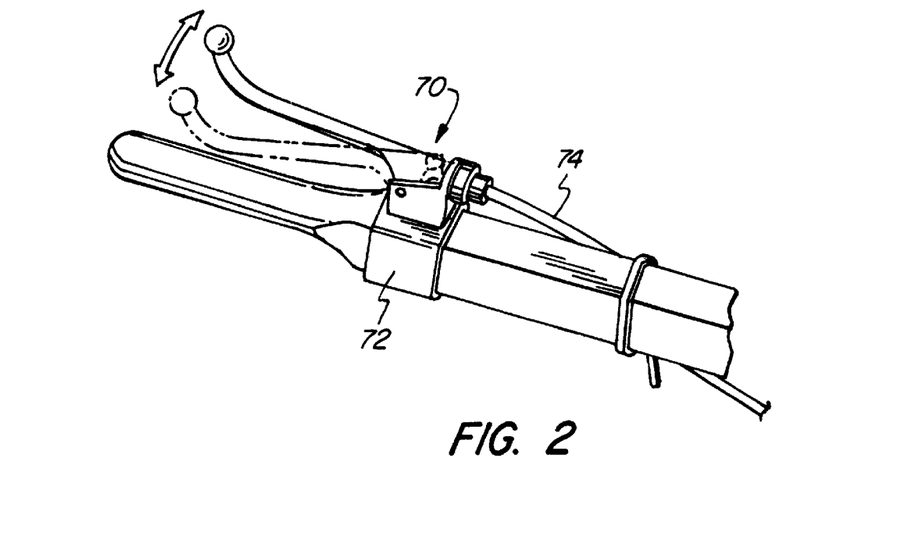
FIG. 2 is a side elevation view of a brake handle operable to actuate the wheelbarrow disk brake assembly of the invention.

A brake lever 70 (shown in FIGS. 1 and 2), is mounted to one of the wheelbarrow handles 12 by a bracket 72 that is mounted by wood screws to the handle 12. Bracket 72 is preferably L-shaped so it can be attached to any size wheelbarrow handle (since the two arms of an L shape will fit against any square or rectangular brake handle), but in other embodiments, the bracket 72 can be U-shaped. In a preferred embodiment, the lever 70 is mounted near the junction of the two legs of the L-bracket, so that when the bracket is mounted to the wheelbarrow handles 12 the lever 70 is positioned out of the way for normal grasping of the handles 12, but is easily grasped to actuate the braking system by using the thumb of the hand. This is due to the offset of the lever from the centerline of the wheelbarrow handles 12. Lever 70 is connects to and pulls on a brake cable 74. Brake cable 74 connect to the actuator 44 of the brake caliper assembly 40 to actuate the disk brakes. A lever locking pin or other mechanism is provided to allow the brakes to be locked in the closed position to safely park a full wheelbarrow on an incline.

A key aspect of the present invention is that both the disk rotor 50 and the caliper bracket 32 are mounted to the hub portion 23 and/or axle 20. This means that the positioning of the brake pads 46 relative to the disk rotor 50 is fixed and unvarying. This allows the use of the caliper brake system of the invention to be easily and conveniently installed by retrofit to existing wheelbarrows without any need for drilling, cutting or other special operations. All that is required is to remove the axle mounting brackets 24 and slip the disk rotor 50 onto the hub a portion 23 and the caliper bracket 32 (with its attached caliper assembly) onto the axle. The disk rotor 50 is fastened in place with the mounting collar 60 as described above. The caliper bracket 32 is held place in different ways, depending on the embodiment, as described below.

Figure 7:
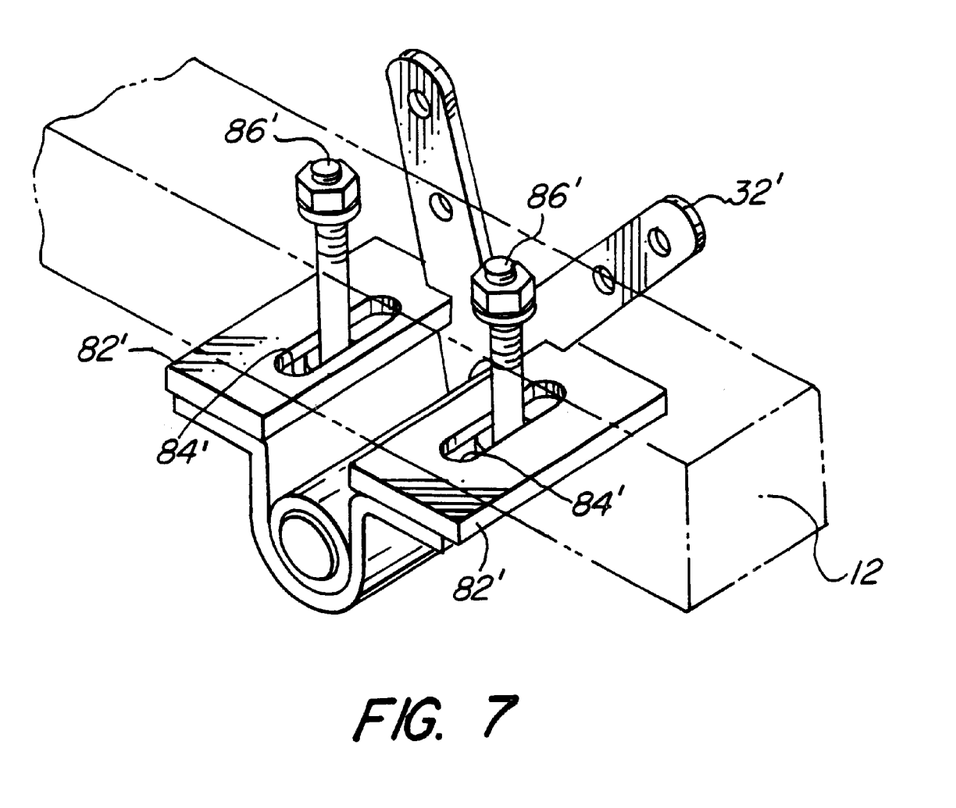
FIG. 7 is a perspective view with wheelbarrow handles in phantom outline showing another embodiment of a caliper bracket of the wheelbarrow disk brake assembly.

In the embodiment shown in FIG. 7, the caliper bracket 32' has mounting arms 82' that are provided as part of caliper bracket 32'. The mounting arms 82' may be integrally formed from caliper bracket 32' and bent into position extending laterally outwardly from caliper bracket 32', or they may be separate pieces welded into position on caliper bracket 32'. Mounting arms 82' are provided with apertures 84'. The caliper bracket 32' is stabilized by securing the mounting arms 82' to the underside of one wheelbarrow handle 12. In the preferred embodiment, the mounting arms 80' are secured by the same bolt or fasteners 82' as are used to mount an axle mounting bracket 24 to the wheelbarrow handle 12.

In the embodiment shown in FIGS. 3–6, the caliper bracket 32 is retained in position by a separate U-shaped mounting bracket 80. Caliper bracket 32 is received between the spaced apart mounting arms 82 of the mounting bracket 80 and held in a desired orientation as shown in the Figures, preferably with the support arms 36 extending upwardly. Mounting arms 82 are provided with apertures 84. The U-shaped mounting bracket 80 is secured to the underside of one wheelbarrow handle 12 by the same bolt or fasteners 86 as are used to mount an axle mounting bracket 24 to the wheelbarrow handle 12. Preferably, caliper bracket 32 is generally V-shaped and a lower portion 88 of the V-shaped caliper bracket 32 is received between the mounting arms 82 of the U-shaped mounting bracket 80. The embodiment just described provides the benefit of being operable to provide a stable brake system without requiring precise positioning and attachment of the caliper bracket to the wheelbarrow handle; this is desirable because the handle thickness may vary among different manufacturers, and by eliminating a fixed spacing requirement for the position of the mounting arms, the embodiment provides a mounting system of universal application.

It is to be appreciated that in the foregoing discussion, the terms "U-shaped" and "V-shaped" are used to define the preferred embodiment of each of the components, but that these terms are not limiting, as any equivalently functional bracket is intended to fall within the scope of the claims. For example, the U-shaped mounting bracket 80 may be V-shaped or Y-shaped or any other shape that encompasses structures with two separated arms. The V-shaped caliper bracket 32 may be U-shaped or Y-shaped, or T-shaped, or rectangular, triangular, or diamond-shaped, etc.

The present invention thus provides a disk brake system that can be quickly and easily installed both as original equipment and as a retrofit, with no additional drilling, cutting or other modification to a standard wheelbarrow. The invention may also be used in the same way in other hand trucks and carts.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. In a wheelbarrow having two handles and a wheel assembly near a forward end of said two handles, said wheel assembly including an axle, and at least one wheel mounted on said axle, and axle mounting brackets mounted to said two handles and holding said axle, an improvement comprising:

a wheelbarrow disk brake assembly, comprising:
 a caliper bracket having an axle hole for receiving said axle and thereby mounting said caliper bracket to said axle, and one or more support arms extending away from said axle, said caliper bracket being retained by at least one mounting arm attached to one of said two handles and positioned thereby in a desired orientation, said at least one mounting arm being provided in a separate mounting bracket having two spaced apart mounting arms, said caliper bracket being received between said two spaced apart mounting arms of said separate mounting bracket;
 a brake caliper assembly mounted to said caliper bracket at a selected distance from said axle hole of said caliper bracket, said brake caliper assembly including an actuator and opposing brake pads; and
 a disk rotor mounted to said axle or wheel cylindrical portion of said wheelbarrow, said disk rotor having a central opening and a diameter selected such that a peripheral area of said disk rotor is positioned within said brake caliper assembly between said opposing brake pads.

2. An improvement in a wheelbarrow in accordance with claim 1, wherein said mounting bracket is U-shaped and is provided with a fastener hole in one or both arms, and said U-shaped mounting bracket is mounted to one of said two handles by one or more fasteners extending through said fastener holes.

3. An improvement in a wheelbarrow in accordance with claim 2, wherein said U-shaped mounting bracket is mounted to one of said handles by bolts also used to mount one of said axle mounting brackets to one of said handles.

4. An improvement in a wheelbarrow in accordance with claim 1, wherein said at least one mounting arm is provided as part of said caliper bracket.

5. An improvement in a wheelbarrow in accordance with claim 4, wherein said at least one mounting arm is provided with one or more bolt holes and is mount to one of said handles by one or more bolts also used to mount one of said axle mounting brackets to one of said handles.

6. An improvement in a wheelbarrow in accordance with claim 1, wherein said caliper is generally V-shaped and a lower portion of said V-shaped caliper bracket is received between said two spaced apart arms of said mounting bracket.

7. An improvement in a wheelbarrow in accordance with claim 1, wherein said one or more support arms of said caliper bracket extend upwardly.

8. An improvement in a wheelbarrow in accordance with claim 1, wherein said disk rotor is affixed to a mounting collar having an axial opening aligned with said central opening of said disk rotor.

9. An improvement in a wheelbarrow in accordance with claim 8, wherein said mounting collar has fasteners to fasten together opposing portions of said mounting collar to clamp said wheel arrow axle or wheel cylindrical portion between said opposing portions.

10. An improvement in a wheelbarrow in accordance with claim 1, wherein said disk rotor is affixed to a mounting collar or an axle bushing having an axial opening aligned with said central opening of said disk rotor, said mounting collar or axle bushing being mounted to said wheelbarrow axle or wheel cylindrical portion.

11. An improvement in a wheelbarrow in accordance with claim 1, further comprising a brake lever mounted to one of said wheelbarrow handles; and a brake cable connecting said brake lever to said brake caliper assembly.

12. In a wheelbarrow having two handles and a wheel assembly near a forward end of said two handles, said wheel assembly including an axle, and at least one wheel mounted on said axle, and axle mounting brackets mounted to said handles to hold said axle, an improvement comprising:

a wheelbarrow disk brake assembly, comprising:
 a U-shaped mounting bracket having two spaced apart arms, said U-shaped mounting bracket being provided with at least one bolt hole in each of said two spaced apart arms, and said U-shaped mounting bracket being mounted to one of said two handles by at least one bolt extending through said at least one bolt hole, said at least one bolt also mounting one of the axle mounting brackets to one of said two handles, with said axle mounting brackets received between said two spaced apart arms of said U-shaped mounting bracket;
 a caliper bracket having an axle hole for receiving said axle thereby mounting said caliper bracket to said axle, said caliper bracket being received between and held in position by said two spaced apart arms of said U-shaped mounting bracket to position said caliper bracket;
 a brake caliper assembly mounted to said caliper bracket at a selected distance from said axle hole of said caliper bracket, said brake caliper assembly including an actuator and opposing brake pads; and a disk rotor mounted to said wheel cylindrical portion of said wheelbarrow, said disk rotor having a central opening and a diameter selected such that a peripheral area of said disk rotor is positioned within said: brake caliper assembly between said opposing brake pads, said disk rotor being affixed to a mounting collar having an axial opening aligned with said central opening of said disk rotor, said mounting collar being mounted to said wheel cylindrical portion.

13. An improvement in a wheelbarrow in accordance with claim 12, wherein said caliper bracket is generally V-shaped and a lower portion of said V-shaped caliper bracket is received between said two spaced apart arms of said U-shaped mounting bracket.

14. An improvement in a wheelbarrow in accordance with claim 13, wherein said V-shaped caliper bracket has a wide base section, said two spaced apart arms and said wide base section defining a waist zone.

15. An improvement in a wheelbarrow in accordance with claim 14, wherein said waist zone of said V-shaped caliper bracket is held between said arms of said U-shaped mounting bracket.

16. An improvement in a wheelbarrow in accordance with claim 12, wherein said U-shaped mounting bracket positions said caliper bracket in, an upwardly extending direction.

17. An improvement in a wheelbarrow in accordance with claim 16, further comprising a brake lever mounted to one of said wheelbarrow handles; and a brake cable connecting said brake lever to said brake caliper assembly.

18. An improvement in a wheelbarrow in accordance with claim 17, wherein said brake lever is mounted to an L-shaped bracket mounted to one of said wheelbarrow handles; with said brake lever positioned offset frog a center axis of said wheelbarrow handle.

19. A wheelbarrow and disk brake assembly, comprising:
wheelbarrow handles;
a wheel assembly near a forward end of said handles, said wheel assembly including an axle, and at least one wheel mounted on said axle, and axle mounting brackets mounted to said handles to hold said axle;
a wheelbarrow bin mounted to an upper side of said handles;
a wheelbarrow disk brake assembly having:
 a caliper bracket having an axle hole for receiving said axle and thereby mounting said caliper bracket to said axle, and one or more support arms extending away from said axle, said caliper bracket being retained by at least one mounting arm attached to one of said handles and positioned thereby in a desired orientation;
 said at least one mounting arm being mounted to one of said handles by one or more fasteners;
 one of said axle mounting brackets being mounted to one of said handles by said one or more fasteners;
 a brake caliper assembly mounted to said caliper bracket at a selected distance from said axle hole of said caliper bracket, said brake caliper assembly including an actuator and opposing brake pads;
 a disk rotor mounted to a wheel cylindrical portion of said wheelbarrow, said disk rotor having a central opening and a diameter selected such that a peripheral area of said disk rotor is positioned within said brake caliper assembly between said opposing brake pads; a brake lever mounted to one of said handles; and a brake cable connecting said brake lever to said brake caliper assembly.

20. A wheelbarrow and disk brake assembly in accordance with claim 19, wherein said at least one mounting arm is provided in a U-shaped mounting bracket having two spaced apart arms, with one of said axle mounting brackets received between said two spaced apart arms of said U-shaped mounting bracket.

21. A wheelbarrow and disk brake assembly in accordance with claim 19, wherein said at least one mounting arm Is provided as part of said caliper bracket.

22. A wheelbarrow and disk brake assembly in accordance with claim 20, wherein said caliper bracket is generally V-shaped and a lower portion of said V-shaped caliper bracket is received between said two spaced apart arms of said U-shaped mounting bracket.

23. A wheelbarrow and disk brake assembly in accordance with claim 19, said disk rotor being affixed to a mounting collar having an axial opening aligned with said central opening of said disk rotor, said mounting collar being mounted to said wheel cylindrical portion, said mounting collar having opposing portions to clamp said wheel cylindrical portion between said opposing portions.

24. A wheelbarrow and disk brake assembly in accordance with claim 23, wherein said mounting collar is welded or bolted to said wheel cylindrical portion.

25. A wheelbarrow and disk brake assembly in accordance with claim 19, wherein said disk rotor is welded to said wheel cylindrical portion.

26. In a wheelbarrow having two handles and a wheel assembly near a forward end of said two handles, said wheel assembly including an axle, and at least one wheel mounted on said axle, and axle mounting brackets mounted to said handles and holding said axle, an improvement comprising:
a wheelbarrow disk brake assembly, comprising:
 a caliper bracket having an axle hole for receiving said axle and thereby mounting said caliper bracket to said axle, and one or more support arms extending away from said axle, said caliper bracket being retained by at least one mounting arm attached to one of said handles and positioned thereby in a desired orientation;
 a brake caliper assembly mounted to said caliper bracket at a selected distance from said axle hole of said caliper bracket, said brake caliper assembly including an actuator and opposing brake pads;
 a disk rotor mounted to said axle or wheel cylindrical portion of said wheelbarrow, said disk rotor having a central opening and a diameter selected such that a peripheral area of said disk rotor is positioned within said brake caliper assembly between said opposing brake pads; and
 wherein said at least one mounting arm is provided in a separate mounting bracket having two spaced apart mounting arms, and said caliper bracket is received between said spaced apart mounting arms of said mounting bracket and positioned thereby in a desired orientation.

27. An improvement in a wheelbarrow in accordance with claim 12, wherein said U-shaped mounting bracket is connected to said caliper bracket to form a single component.

28. An improvement in a wheelbarrow in accordance with claim 27, wherein said at least one mounting arm is provided with one or more bolt holes and is mounted to said wheelbarrow handle by one or more bolts also used to mount an axle mounting bracket to said wheelbarrow handle.

29. An improvement in a wheelbarrow in accordance with claim 1, wherein said caliper bracket is generally V-shaped and is received between said two spaced apart arms of said mounting bracket.

* * * * *